Nov. 24, 1959 — M. R. McKELLAR — 2,914,038
BEARING CAP TO FRAME TO OIL PAN SEAL
Filed June 14, 1957 — 2 Sheets-Sheet 1
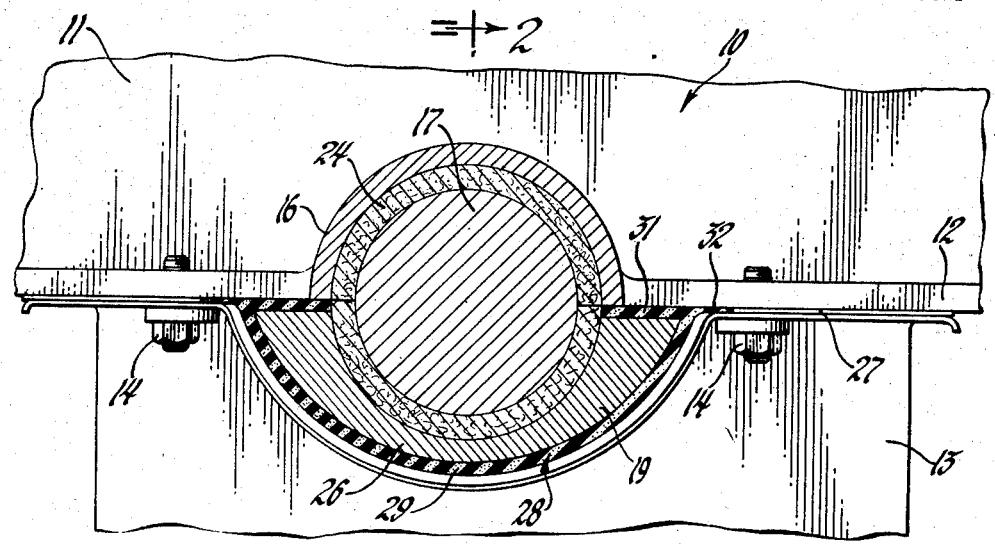
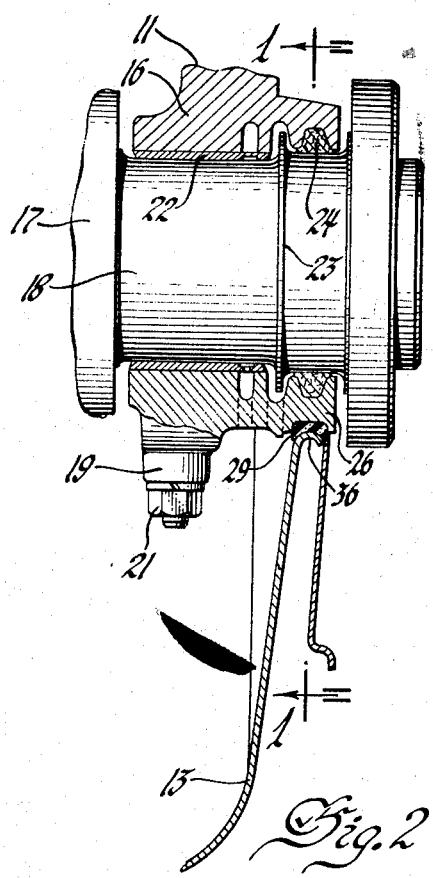
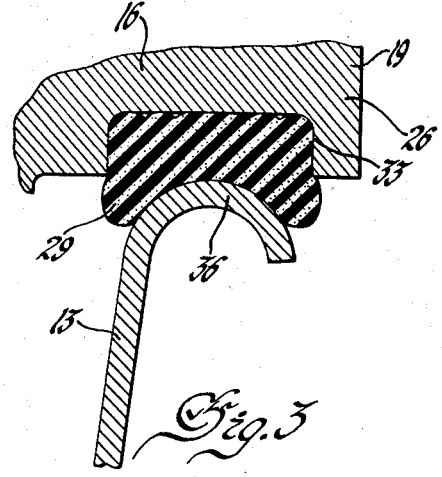
INVENTOR
Malcolm R. McKellar
BY
ATTORNEY Nov. 24, 1959     M. R. McKELLAR     2,914,038
BEARING CAP TO FRAME TO OIL PAN SEAL
Filed June 14, 1957     2 Sheets-Sheet 2

INVENTOR
Malcolm R. McKellar
BY
L. D. Burch
ATTORNEY

United States Patent Office 2,914,038
Patented Nov. 24, 1959

2,914,038

BEARING CAP TO FRAME TO OIL PAN SEAL

Malcolm R. McKellar, Birmingham, Mich., assignor to General Motors Corporation, Detroit, Mich., a corporation of Delaware Application June 14, 1957, Serial No. 665,796

5 Claims. (Cl. 121—194)

This invention relates to sealing or gasket means especially applicable for employment adjacent the rear main bearings in internal combustion engines for automotive and other uses.

It is proposed to provide gasket or sealing means that may be employed between the rear main bearing cap and the oil pan and frame, in such an engine for automotive purposes. The sealing or gasket means is so constructed as to provide laterally extending ends that project between the bearing cap and the frame and the oil pan and the frame, thus insuring that there will be no objectionable leakage of oil in the region where the three parts of the engine join.

In the drawing Figure 1 is a fragmentary rear end elevational view of an internal combustion engine embodying the invention. The structure is broken away and shown in cross section in the region where the crankshaft projects from the engine and where the crankshaft is supported by the rear main bearing of the engine. Figure 1 is taken substantially in the plane of line 1—1 on Figure 2, looking in the direction of the arrows thereon.

Figure 2 is a fragmentary longitudinal sectional view of the engine shown by Figure 1 and taken substantially in the plane of 2—2 of Figure 1, looking in the direction of the arrows thereon.

Figure 3 is an enlarged fragmentary view of a part of the sealing means between the bearing cap and oil pan, as this structure is illustrated by the preceeding figures.

Figure 4:
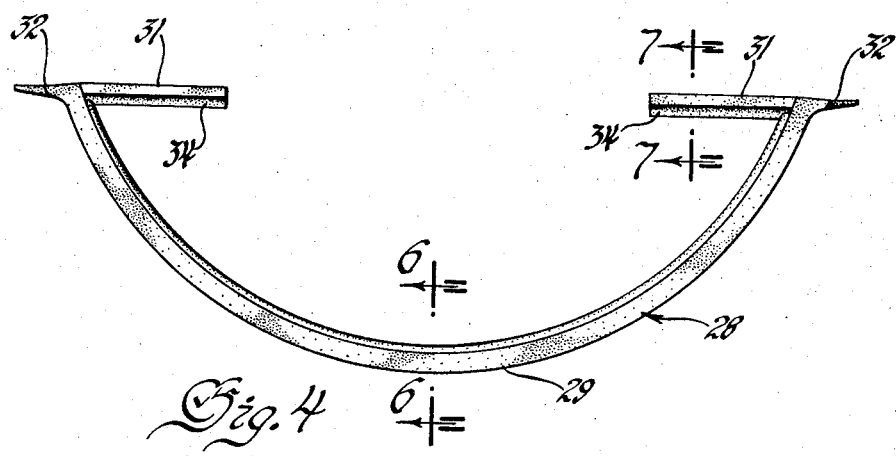
Figure 4 is an enlarged side elevational view of the sealing means or gasket embodied in the engine structure illustrated by the preceeding figures.
Figure 6:
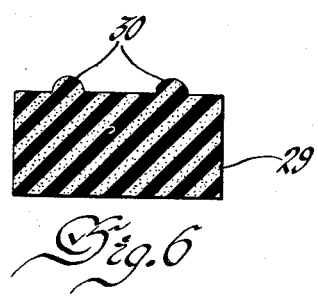
Figure 7:
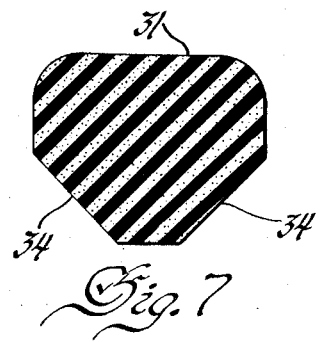
Figure 5:
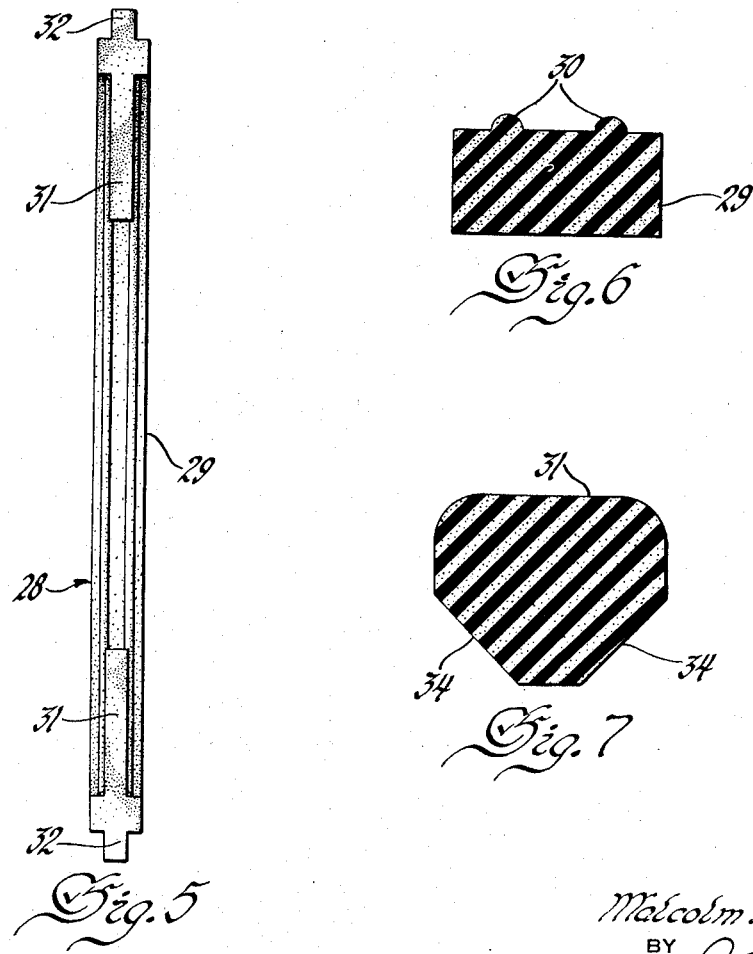
Figure 5 is a plan view of the structure shown by Figure 4.

Figures 6 and 7 are cross sectional views of the gasket or sealing means shown by Figures 4 and 5 and taken respectively in the planes of lines 6—6 and 7—7 on Figure 4, looking in the direction of the arrows thereon.

The engine 10 embodying the invention comprises an engine frame or block 11 having a securing flange 12 formed around the lower extremity thereof and to which the oil pan 13 of the engine is secured by bolts 14. The frame 11 is formed to provide a rear main bearing 16 for the crankshaft 17 of the engine 10, the crankshaft 17 being formed to provide a journal 18 by which the crankshaft is supported in the bearing 16. The bearing 16 is formed to provide a bearing cap 19 secured to the frame 11 by bolts 21. The bearing 16 may have bearing sleeve sections indicated at 22 in both the frame and bearing cap parts of the bearing.

In order to seal the crank case of the engine 10 against objectionable leakage of oil through the bearing 16 and around the journal 18 it is customary to provide oil slinger and drain groove means such as is indicated at 23. This reduces the amount of oil which will approach the end of the shaft 17 which projects beyond the bearing 16 and outwardly of the frame 11 and oil pan 13. It is also customary to provide a felt or other suitable fibrous sealing ring 24 around the shaft 17 beyond the sealing means 23 and adjacent the rear end extremity of the bearing 16. The sealing ring 24 will reduce the leakage of oil between the journal and the bearing for the shaft 17 to an acceptable maximum.

It is also necessary in engines embodying such bearing seal construction to seal the oil pan of the engine to the lower flanged edge of the engine frame and to the outwardly projecting part of the rear bearing cap supporting the engine crankshaft. Such an outwardly projecting part of the bearing cap 19 is indicated at 26. It has been customary in most instances simply to employ a gasket such as that indicated at 27 between the flanged lower edge of the frame 10 and the flanged upper edge of the oil pan 13, this gasket being in some instances formed to extend between the outwardly projecting part 26 of the bearing cap 19 and the depressed rear end of the oil pan of the engine. It is also customary in some instances to employ a separate gasket between the bearing cap and the oil pan in such region. However, notwithstanding the gasket means employed, there has sometimes been somewhat more than an acceptable leakage around the rear main bearing of the engine. It has been found that much of the excess leakage in this region has been caused by leakage between the engaging surfaces of the rear bearing cap and the part of the frame to which the cap is supported. These surfaces extend diametrically outwardly from the bearing surfaces of rear main bearing which are intersected by the groove in which the seal 24 is disposed. When leakage does occur through these surfaces it will be apparent that it will be difficult to prevent leakage outwardly through the crank case of the engine, particularly in the regions where the oil pan, the rear main bearing cap and the flanged lower edge of the engine frame join. In order to prevent such leakage it is proposed to provide a gasket such as that indicated at 28 and consisting of an arcuate middle part 29 from the opposite ends of which inwardly and outwardly projecting ends 31 and 32 respectively are formed. The middle part 29 may be provided with circumferential beads 30 on the inner surface thereof to aid in sealing against the outwardly projecting part 26 of the bearing cap 19. The part 26 may be formed to provide a groove 33 in which the middle part 29 may be compressed enough so that the gasket will tend to stay with the bearing cap 19 when other parts are removed. The inwardly projecting ends 31 are formed on the inner surfaces thereof to provide tapering side surfaces 34 which are adapted to engage grooves formed in the surfaces by which the bearing cap is supported on the engine frame. The outwardly projecting ends 32 are simply tapered down to the approximate thickness of a gasket means 27 employed in sealing the oil pan 13 to the frame 11.

As is usual in such instances the oil pan 13 has a beaded edge 36 around the depressed end wall of the pan through which the rear end of part 26 of the journal 19 is adapted to project. The beaded edge flange 36 is adapted to compress the middle part 29 of the sealing means 28 in the groove 33 in the bearing cap end 26, as is indicated in Figure 3. The inwardly projecting ends 31 are compressed between the supporting surfaces for the bearing cap 19 and the outwardly projecting ends 32 extend between the flanged edge of the oil pan 13 and the supporting flange 12 of the engine frame 11.

It will be noted that in the areas where the bearing cap, the oil pan and the frame join that only a single sealing means is employed. Such areas are at the junctions between the middle part 29 and the end parts 31 and 32 of the sealing means 28.

I claim:

1. A gasket for an engine having an engine frame in which a bearing with a removable bearing cap is formed and to which an oil pan is removably secured about said bearing cap and comprising, an arcuately formed strip adapted to be compressed between said oil pan and said bearing cap and having substantially diametrically inwardly directed ends adapted to be compressed between said bearing cap and said frame when said bearing cap is secured to said frame.

2. A gasket for an engine having an engine frame in which a bearing with a removable bearing cap is formed and to which an oil pan is removably secured about said bearing cap and comprising, an arcuately formed strip adapted to be compressed between said oil pan and said bearing cap and having substantially diametrically outwardly directed ends adapted to be compressed between said oil pan and said frame when said bearing cap and said pan are secured to said frame.

3. A gasket for an engine having an engine frame in which a bearing with a removable bearing cap is formed and to which an oil pan is removably secured about said bearing cap and comprising, an arcuately formed strip adapted to be compressed between said oil pan and said bearing cap and having substantially diametrically inwardly and outwardly directed ends respectively adapted to be compressed between said bearing cap and said frame and between said pan and said frame.

4. A bearing construction for an engine having an engine frame in which a bearing having a shaft journaled therein is formed and from which said shaft projects outwardly of said engine and comprising, a bearing cap forming a part of said bearing and being removable from said frame, an oil pan secured to said frame and extending around said bearing cap, said shaft being adapted to project outwardly of said engine between said frame and said oil pan and through said bearing, a seal between said bearing and the journal of said shaft, and a gasket between said oil pan and said bearing cap, said gasket being formed to provide inwardly disposed ends extending between said bearing cap and said frame and terminating at said seal.

5. A bearing construction for an engine having an engine frame in which a bearing having a shaft journaled therein is formed and from which said shaft projects outwardly of said engine and comprising, a bearing cap forming a part of said bearing and being removable from said frame, an oil pan secured to said frame and extending around said bearing cap, said shaft being adapted to project outwardly of said engine between said frame and said oil pan and through said bearing, a seal between said bearing and the journal of said shaft, a gasket between said oil pan and said bearing cap, said gasket being formed to provide inwardly and outwardly disposed ends extending between said bearing cap and said oil pan and said frame, said inwardly disposed ends of said gasket terminating at said seal.

References Cited in the file of this patent

UNITED STATES PATENTS

| | | |
|---|---|---|
| 2,798,907 | Shafer | May 24, 1955 |
| 2,746,429 | Vann | May 25, 1956 |
| 2,778,338 | Shafer | Jan. 22, 1957 |

UNITED STATES PATENT OFFICE
CERTIFICATE OF CORRECTION

Patent No. 2,914,038                                                          November 24, 1959

Malcolm R. McKellar

It is hereby certified that error appears in the printed specification of the above numbered patent requiring correction and that the said Letters Patent should read as corrected below.

Column 4, line 28, list of references cited, for the patent number "2,798,907" read -- 2,708,907 --.

Signed and sealed this 7th day of June 1960.

(SEAL)
Attest:
KARL H. AXLINE
Attesting Officer

ROBERT C. WATSON
Commissioner of Patents